United States Patent [19]
Prueitt

[11] 3,945,722
[45] Mar. 23, 1976

[54] DYNAMIC COLOR PATTERN GENERATOR
[76] Inventor: Melvin L. Prueitt, 161 Cascabel, Los Alamos, N. Mex. 87544
[22] Filed: Aug. 20, 1974
[21] Appl. No.: 499,057

[52] U.S. Cl. .................................. 353/122; 353/77
[51] Int. Cl.² ......................................... G03B 21/00
[58] Field of Search ....... 240/3.1, 2 LC, 41 C, 10.1; 272/10; 353/84, 1, 2, 122, 74, 77; 40/106.21, 106.22

[56] References Cited
UNITED STATES PATENTS

| 2,417,621 | 3/1947 | Traub | 353/84 |
| 2,953,676 | 9/1960 | Glasser et al. | 240/10.1 |
| 3,689,139 | 9/1972 | Gross et al. | 353/84 |

Primary Examiner—Harry N. Haroian
Attorney, Agent, or Firm—Paul D. Gaetjens

[57] ABSTRACT

To produce the most pleasing display of the color patterns, the colored light, which is produced by interference of light waves from the two surfaces of a thin liquid film, is separated from the principal beam of the incident light, magnified, and projected onto a screen. Reflection from the thin liquid film is specular reflection (angle of reflection equals angle of incidence). The position of the projection lens is determined by the position of the light source. Thin liquid films, such as soap bubbles, reflect colored light by interference of light waves which reflect from the front and back surfaces of the films. The color of the light is a function of the thickness of the film.

6 Claims, 7 Drawing Figures

DYNAMIC COLOR PATTERN GENERATOR

BACKGROUND OF THE INVENTION

1. Field of the Invention

The dynamic color patterns of a liquid film are enlarged are reproduced on a screen for aesthetic appreciation. The device of this invention produces the film, magnifies and projects the light patterns, and automatically renews the film. Since the thickness of the liquid film suspended in the air varies from point to point over the surface, interesting and beautiful color patterns are produced. All the spectral colors plus purple, magneta, tan and brown are produced. Even black is subjectively experienced by the observer at places where the film becomes so thin that almost no reflection occurs. The average size of the various color regions is governed by the type of liquid used and the boundary conditions. An ordinary soap bubble has small color patterns. A suitable liquid film formed within a large loop developes much larger features. The color features in liquid film continually evolve in form and position during the life of the film due to the effects of gravity on the density gradients of the film. Air currents, thermal gradients, electric currents, and variations in surface tension also cause the patterns to change. This dynamic behavior, along with the brilliant and pastel colors, create a fascinating display when projected onto a screen. The lifetime of a liquid film in air in a sealed container can be from several minutes to several hours, depending on the type of liquid used. When the plane of a liquid film within a loop is vertical, the lifetime of the film is less than that when the plane of the film is horizontal, but the patterns are more active in the former case. The colors are usually of better quality in the upper portion of the vertical film.

2. Prior Art

Liquid films suspended in air are a natural choice as a source of color designs for a light display device. Ordinary electronic light display boxes have a limited number of colors and a limited number of patterns, and the sequence of patterns is usually governed by complex electronics. The device of this invention produces all the colors in an infinite variety of patterns, and the sequence of patterns is a continuous evolution from one design to the next—governed by the laws of nature acting on the thin liquid film.

U.S. Pat. No. 3,262,359, issued to V. J. Carpenter July 26, 1966, discloses a rear projection viewer comprising an object plane whereat an object is held to be projected onto a screen, said viewer further comprising a light source and a condenser aligned to illuminate said object, a projection lens system including a pair of positive lenses and a negative lens aligned therebetween constituting a beam displacer, said lens system being located to form an immobile image of said object on said screen which is optically conjugate to said object plane, a rotatable member which is mounted for rotation in a plane normal to the projection axis of said viewer and is located substantially concentrically of said axis, said beam displacer lens being held in said member eccentrically of said axis by a dimension less than the effective radius of said lens so as to function as a rotating beam displacer, whereby the image rays formed by said lens are focused at a stationary point on said screen while while rotating about said axis to eliminate scintillation of the screen.

U.S. Pat. No. 3,473,428, issued to Edward H. Phillips Oct. 21, 1969 discloses an electrical transducer connected with a sound reproducing system so as to produce pulsating movements in accorance with the sound of the system. A plurality of light-reflecting elements are supported by the transducer for movement relative thereto in response to the pulsating movements of the transducer. A source of light is beamed downwardly at an angle onto the reflecting surface. A template is positioned adjacent the source of light so that the light beam has a particular design which in turn is reflected onto the receiving surface.

U.S. Pat. No. 3,554,537, issued to Edward H. Phillips Jan. 12, 1971, discloses a source of light and a template having a plurality of shaped holes formed therethrough disposed adjacent the source of light. A control means is provided for selecting which one of the shaped holes of the template means is disposed adjacent the source of light. The light beam passing through the template means is adapted to impinge upon a plurality of reflecting lens means mounted on a movable support. Each of these reflecting means includes a curved optical surface for reflecting an image onto one or more surfaces. Each of the lenses includes means for determining the color reflected from the lens means. The lens means includes asymmetrical bodies which tend to cant the lens means for random orientation of the various individual reflecting lens means.

U.S. Pat. No. 3,738,036 issued to Edmund E. Landsinger June 12, 1973 discloses a disc having a thin chamber filled with immiscible fluids such as glycerine and air to form floating bubbles, the chamber having barriers or chamber regions of different thickness to provide a sudden change in movement of the bubbles. In one disc, several barriers extend partially across the chamber so that the bubbles slither around the barrier. In another disc, the chamber includes thick regions connected by narrow tubes so that the bubbles suddenly accelerate when they enter the thick regions.

U.S. Pat. No. 3,768,886, issued to Edward N. Sharpless Oct. 30, 1973, discloses a display device for presenting a visual indication of pressure, said device comprising a support capable of supporting a layer of liquid crystalline material thereon, said material having a characteristic of selective light scattering which is variable in accordance with applied deformational stress, and means for applying deformational stress to said material.

SUMMARY OF THE INVENTION

The device of this invention shows how the color patterns are magnified and projected onto a rear-projection screen. Light from an electric lamp is condensed through a condenser lens to shine upon a thin liquid film. Electromagnetic wave interference in the film colors the reflected light, which is then projected onto the screen by the projection lens. The use of a thin liquid film is the critical feature of this invention. The projection lens may be a simple lens, but a compound lens gives better quality projection. The life of a liquid film can be many minutes in a sealed container. When the film breaks, it can be renewed. The film is supported by a loop or by a suspension bar at the top with strings at the sides. The bar is lowered into the liquid pool by a lever arm. When it is raised, it draws up a fresh film. A shaft from the lever arm extends through the wall of the sealed container. It can be actuated

DESCRIPTION OF THE PREFERRED EMBODIMENT

Figure 1:
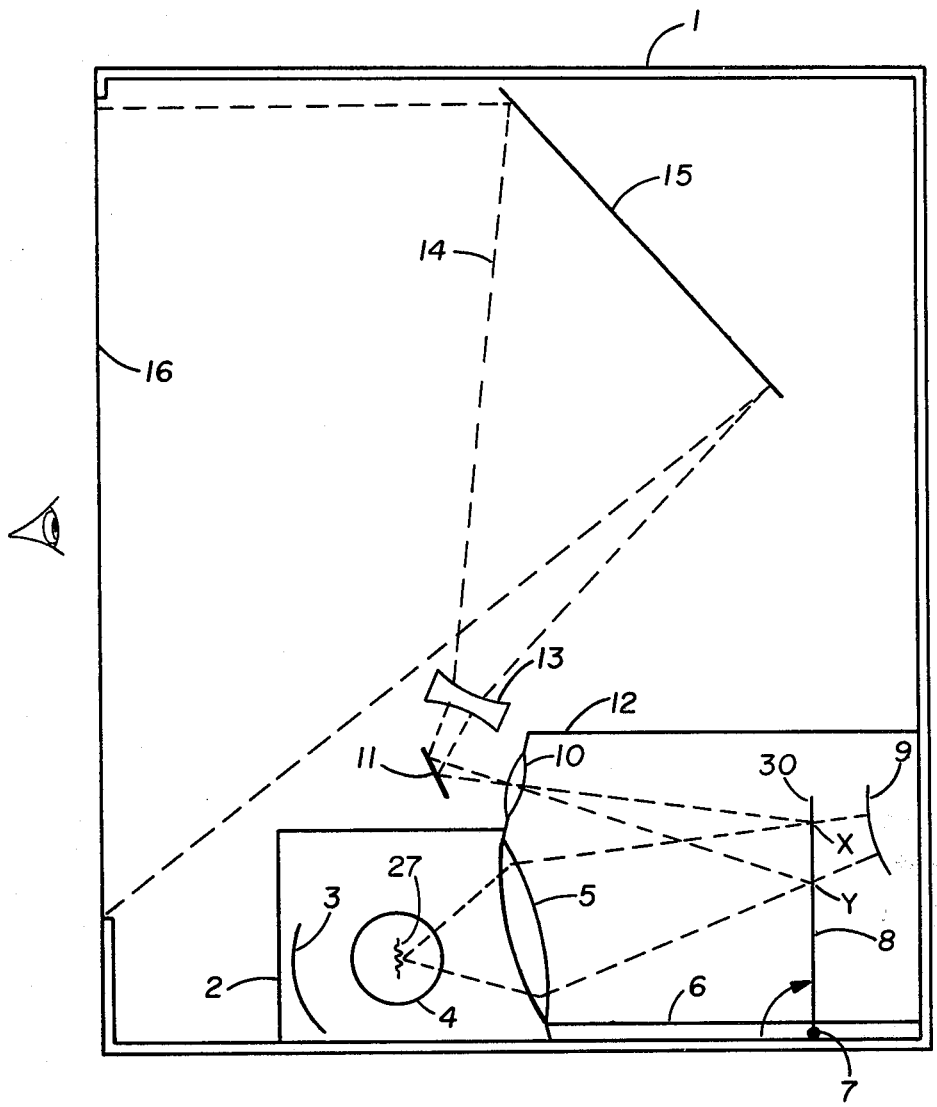
FIG. 1 is a partial diagrammatic side view of the preferred embodiment of this invention.

In FIG. 1, as the loop 30 (viewed edge on) is raised by rotation about the pivot 7, a liquid film 8 is drawn up out of the pool 6 of solution and forms a plane within the loop 30 at the vertical position. Light from the bulb 4 contained in lamp housing 2 passes through the condenser lens 5 and strikes the liquid film 8. The colored light is reflected specularly to the projection lens 10 which projects the image onto the rear-projection screen 16 by means of mirror 11, concave lens 13, and mirror 15. The image is observed from outside the cabinet 1. Mirror 3 is a concave mirror which forms an image of the filament just beside the real filament 27 and thus increases the amount of light available at the liquid film 8. Since only a fraction of the incident light is reflected by the film, mirror 9 is placed at such a point and has such a radius of curvature that a virtual image of the filament is formed at the position that the condensing lens 5 would normally from the filament image. The radius of curvature is equal to the distance from the mirror 9 to the place the filament image would be if the mirror were not there. Mirror 9 may be a plane mirror if it is located at the filament image point. Mirror 9 then reflects the main beam of light back through the condenser lens 5 to mirror 3 which reflects the light back for another pass through the film 8.

It should be noted that the rays from the points x and y on the film 8 to the projection lens 10 are of different length. This ordinarily causes parts of the image on the screen to be out of focus and produces variation in magnification. The latter is unimportant in this application since the color patterns are not familiar shapes, and the observer is unaware of any distortion. The problem of lack of focus can be reduced by providing a fairly long focal length system and folding the beam within the cabinet 1 with mirrors 11 and 15 to provide adequate magnification. By utilizing the concave lens 13 with appropriate parameters, this lack of sharpness can be minimized, and the magnification is increased. The lack of focus is also reduced by placing mirror 15 off-center, that is, it is not centered behind the screen 16. Notice that the light ray 14 from y is lengthened with respect to the light ray from x in order to improve focus. When an object is closer to a projection lens the screen should be further away. The film housing 12 should be sealed to prevent evaporation of the liquid 6.

A. Producing the Liquid Film

Figure 2:
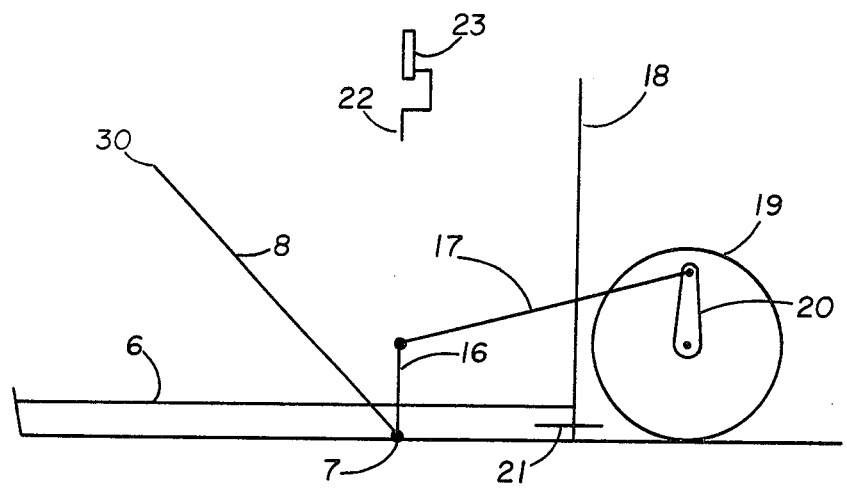
FIG. 2 is a diagrammatic side view of the film forming apparatus used in FIG. 1.

FIG. 2 shows a mechanism for producing the liquid film 8. The loop 30 is shown in a position halfway between the horizontal and the vertical as it would appear when it is moving toward the vertical by means of connecting rod 17, lever arm 16 and pivot 7. The output of the motor 19 is geared down so that the crank 20 turns one rotation in about 3 seconds. The cycle is complete when the loop 30 reaches the vertical position. The motor is automatically turned off at this point when the film contacts electrode 22. The stop bar 23 is positioned to cause the loop 30 to stop at the right place. When the motor 19 is turned off, angular momentum will cause it to coast for an irreproducible distance. The mechanism is designed such that the motor attempts to move the loop 30 past the stop bar 23. Flexibility of the lever arm 16 allows the loop to stop. The motor 19 will start another cycle when the film 8 breaks.

B. Automatic Replacement of the Liquid Film

Figure 3:
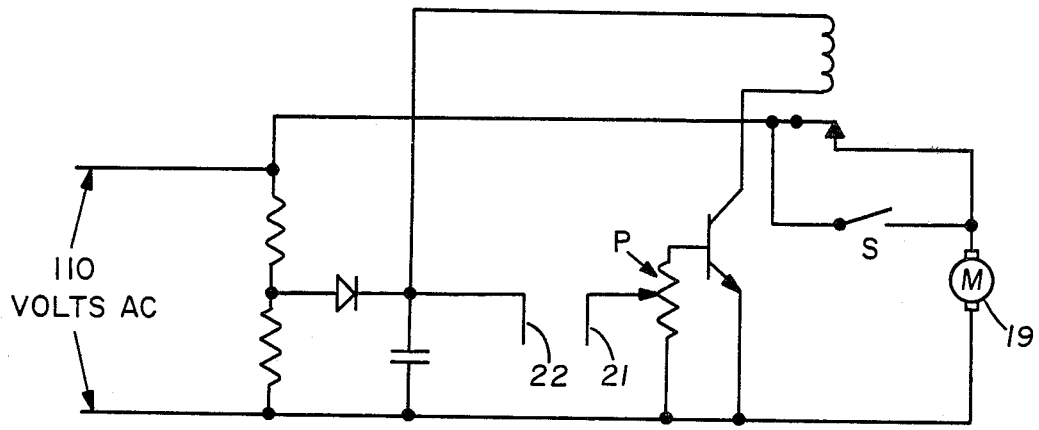
FIG. 3 is a circuit diagram showing the electrical components of FIG. 2.
Figure 4:
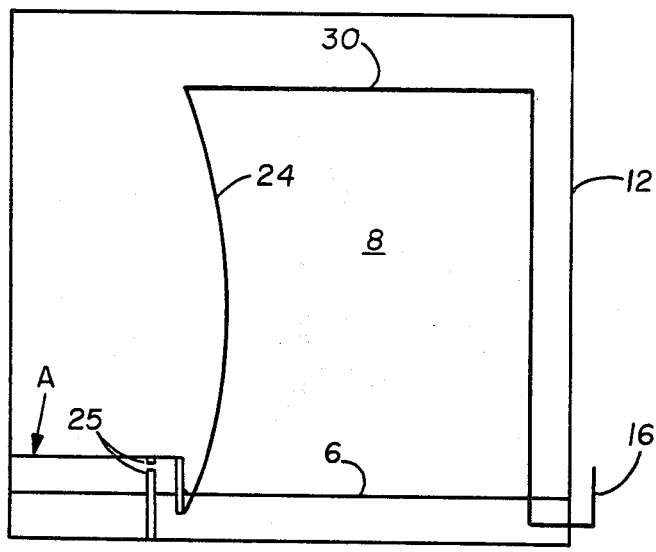
FIG. 4 is a diagrammatic end view showing another embodiment of this invention for replacing the film.

Since the liquid film has a finite lifetime, it needs to be replaced periodically as shown in FIG. 2. Electrode 21 is placed in the liquid pool 6 and electrode 22 is placed in such a position that it contacts the liquid film when the loop is vertical. Electric current can then flow from one electrode to the other through the film and the liquid pool. When the film breaks, the circuit is broken. The circuit diagram in FIG. 3 shows a simple transistor circuit which can operate the motor 19. When the liquid film is present, the transistor conducts and drives a small relay to keep the motor off. When the film breaks, the transistor stops conducting, and the relay turns on the motor 19. The potentiometer P can be used to adjust the sensitivity of the circuit. As the film gets thinner, the resistance of the film increases. Thus P can be adjusted to actuate the motor when the film gets to the desired thinness. Switch S is a pushbutton which can be depressed when the observer wants to change films before automatic replacement. Another method (not shown) for replacing the film utilizes a photocell or photodiode. A portion of the light reflected from the film falls on the photocell. When the film breaks or becomes so thin as to become nonreflecting, the current decreases. The photocell current can be amplified by a transistor to drive a relay just as in FIG. 3. A still further method for replacing the film utilizes the surface tension of the liquid film 8 contained in housing 12. If one side of the loop 30 is replaced by a string 24 as shown in FIG. 4, the surface tension of the film pulls the string toward the center of the loop 30. This force is resisted by the spring tension in a steel strip A. But by pulling the string 24 toward the center of the loop 30, the electrical contact is broken between the contacts 25. When the film breaks, the string becomes straight and electrical contact is made. Current through the contacts 25 drives the motor and lever arm 16 directly without the transistor circuit and relay. For this method, a second switch, which is actuated by the motor crank, turns on shortly after the cycle begins to keep the motor running and does not turn off until the end of the cycle. This assures that the motor will not stop when the loop 30 is on the way up during the last half of the cycle. Another method of replacing the film is to have a clock mechanism periodically turn on motor 19. The motor would be turned off when crank 20 trips a switch at the end of the cycle. The film can also be produced by a very slowly rotating wheel with half the wheel submerged in the liquid (not shown). The film forms between the spokes and passes through the light beam. There are two variations of this idea. A cylinder with open rectangles on the circumference can be used instead of the wheel. The bottom of the cylinder rotates through the liquid pool forming films in the rectangles. The second variation utilizes a belt which slowly travels under a pulley in the liquid pool and over a pulley above the pool. Liquid film forms in the openings in the belt.

C. The Out-of-Focus Problem

Figure 5:
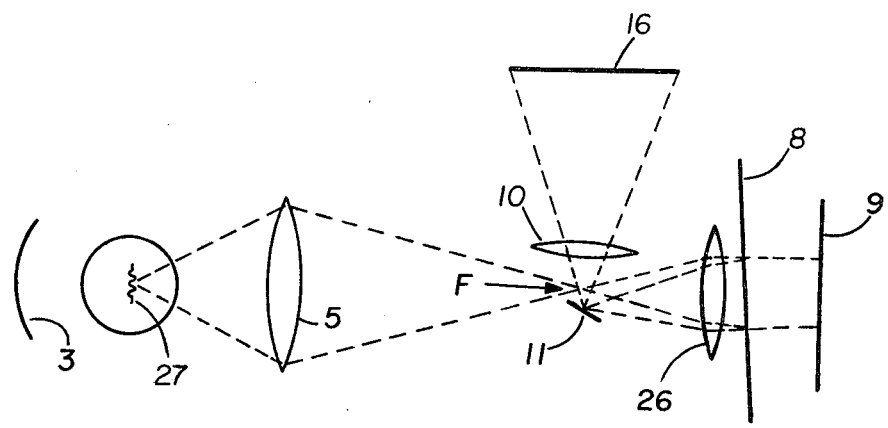
FIG. 5 is a diagrammatic view of a lens system which solves the problem of focusing a thin film on a screen.

A problem inherent in color pattern generators is solved by this invention. When the film is slanted with respect to the direction of projection, part of the image on the screen tends to be out of focus due to the different path lengths from the film to the projection lens. One method was given in the description of the preferred embodiment, namely, by placing mirror 15 off-center or by slanting the screen with respect to the projection beam. FIG. 5 presents another solution to this problem. The condenser lens 5 produces an image of the filament 27 at point F. Lens 26, a convex lens which is placed close to the film, collimates the light. Its focal length is equal to the distance from itself to the point F. The film 8 is just slightly slanted with respect to the vertical. The colored light which is reflected from the film 8 passes through the lens 26 and converges on mirror 11. That is, a colored image of the filament is formed at mirror 11. The light is reflected by mirror 11 through the projection lens 10 to the screen 16. The projection lens 10 is focused on the film 8 so that the film image appears on the screen 16. Mirror 9 reflects the main beam back to point F and then to mirror 3. One of the difficulties with this system is that images of the filament 27 are reflected from the surfaces of lens 26. These show up as a faint filament image on the screen 16. This effect can be reduced by using a coated lens for lens 26.

Figure 6:
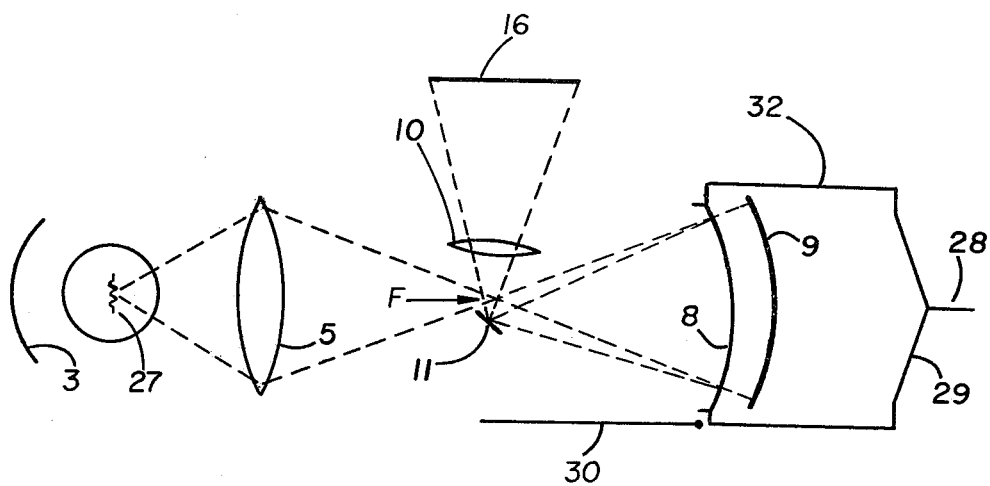
FIG. 6 is a diagrammatic view of an alternative lens system to that of FIG. 5.

A variation of this idea, which eliminates lens 26 is illustrated in FIG. 6. The loop 30, shown in the lowered position for clarity of the drawing, raises a film 8 to a circular opening in a box 32. The film 8 adheres to the perimeter of the opening. The last part of the cycle is accomplished by moving the actuating rod 28 to the right which pulls the elastic membrane 29 and reduces the air pressure in the box. The box 32 is sealed except for the opening. The film 8 is drawn inward to form a concave surface facing the light source 4. The condenser lens 5 produces an image of the filament 27 at point F. If the film 8 is drawn in so that the radius of curvature is approximately equal to the distance from itself to the point F, and, if the box face is slightly slanted, the reflected light from the film forms an image of the filament 27 on mirror 11. The shape of the film is not perfectly spherical, of course, so that the filament image is somewhat distorted, but that is unimportant. The projection lens 10 is focused on the film 8 and the distance from the projection lens 10 to the various points on the film 8 is fairly constant. The image is projected onto the screen 16. Mirror 9 in this case is a concave mirror with a radius of curvature equal to the distance from itself to point F. It returns the main beam back to mirror 3.

D. Another Embodiment of the Invention

Figure 7:
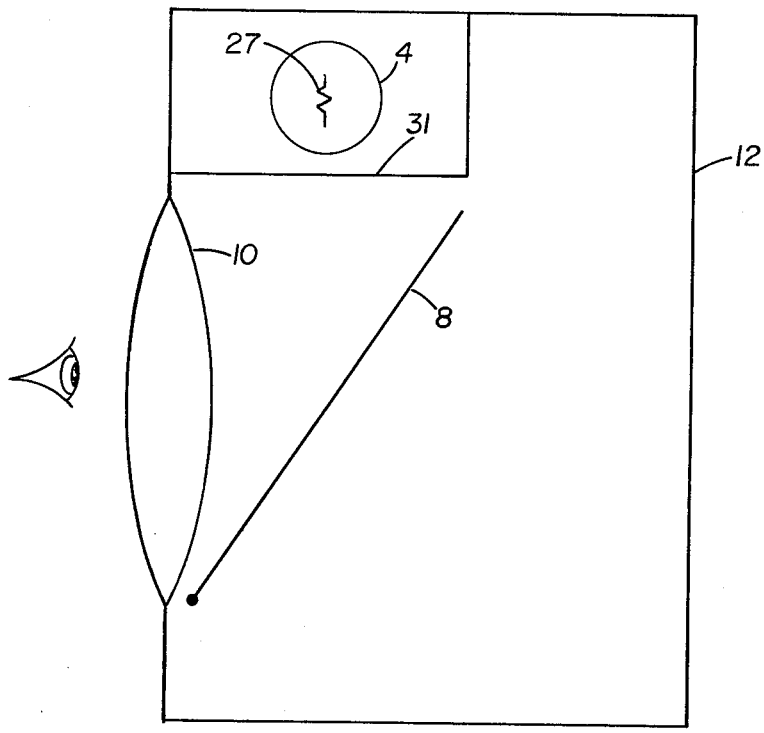
FIG. 7 is a diagrammatic side view of an alternative embodiment of this invention.

For a small color pattern generator, such as a TV light or a night light, the device might be designed as shown in FIG. 7. In this case, the color images are projected directly to the eye of the viewer without the use of a screen. Light from lamp 4 is scattered randomly by a frosted glass 31. A portion of the light is reflected from the film 8 through lens 10 to the eye of the viewer. Lens 10, which magnifies the image, is a convex lens or a positive Fresnel lens (a thin plastic or glass lens with engraved circular lines which simulates an ordinary lens). Encyclopedia Britannica, v. 13, p. 923 (1963). The focal length of lens 10 should be greater than the distance from itself to the farthest point of the film 8.

E. Enhancing the Activity of the Liquid Film

A suitable liquid produces a film with adequate activity to produce a moderately fast evolution from one design to the next. If faster evolution is desired, a different solution may be used or one of the following may be done:
1. Place an electrical resistor in the film and connect it to a voltage supply. A small amount of warmth generated by the resistor creates density gradients which make the patterns move.
2. Pass a small electric current through a portion of the film between two electrodes.
3. Move air currents over the film by a mechanical device such as a slowly rotating fan.
4. Place an electrical resistor near the film. This has two effects. It moves air currents, and it warms the air near the film causing local evaporation which affects the surface tension and the local density of the film.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What I claim is:
1. A dynamic color pattern generator which continually produces colored light patterns reflected from the two surfaces of a thin liquid film and displayed upon a screen comprising:
   a. a light source means positioned within a first container, and directed at the thin liquid film,
   b. means for continually forming the thin liquid film supported by surface tension within a loop-like structure, and enclosed in a second air-sealed container positioned inside first container, and
   c. means for projecting the colored light patterns which are reflected from the said two surfaces of the thin liquid film onto the said screen.
2. The generator of claim 1 in which the light source means comprises:
   a. a light bulb 4 positioned in front of a reflecting mirror 3,
   b. the light from said bulb shines directly through an adjacent condenser 5, and
   c. strikes the surfaces of the thin liquid film 8.
3. The generator of claim 1 in which the means for forming the thin liquid film comprises:
   a. a loop-like structure,
   b. a liquid pool through which the loop structure is passed,
   c. the loop structure connected to a motor, and d. electronic circuit means for detecting the film thickness and for actuating the said motor.

4. The generator of claim 1 in which the means for projecting the light reflected from the surfaces of the liquid film onto a screen comprises:
   a. a projection lens 10,
   b. a first mirror 11 that reflects the colored light,
   c. a concave focusing lens 13 that passes the colored light from mirror 11, and
   d. a second mirror 15 that is situate off-center as to the center of the screen 16 and reflects this light onto the screen 16.

5. The generator of claim 1 in which the light source means includes a light scattering frosted glass element, and in which the means for projecting the light reflected from the surfaces of the liquid film comprises a convex lens 10 having a focal length greater than the distance from said lens to the farthest point of the film 8.

6. The generator of claim 1 in which the means for forming the thin liquid film comprises:
   a. a third container 32 positioned within the said second air-sealed container having a circular opening facing the light source, a loop 30 having a dimension about the same size as said opening and positioned in said second air-sealed container, and rotatable from a liquid pool to the said opening,
   b. one wall of said container 32 consisting of an elastic membrane 29, and
   c. attached to said membrane is a rod 28 which adjusts the membrane's position and affects the air pressure in the said third container 32 so that the liquid film 8 is made concave thus reflecting the light back to mirror 11.

* * * * *